United States Patent
Yeh et al.

(10) Patent No.: US 11,068,764 B2
(45) Date of Patent: Jul. 20, 2021

(54) SMART CARD AND CONTROL METHOD THEREOF

(71) Applicant: ELAN MICROELECTRONICS CORPORATION, Hsin-Chu (TW)

(72) Inventors: I-Hau Yeh, Hsinchu (TW); Ta-Huang Liu, Hsinchu (TW); Hsiao-Hua Tsai, Zhubei (TW); Ming-Ho Wang, Hsinchu (TW)

(73) Assignee: ELAN MICROELECTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/035,556

(22) Filed: Sep. 28, 2020

(65) Prior Publication Data

US 2021/0182642 A1 Jun. 17, 2021

(30) Foreign Application Priority Data

Dec. 16, 2019 (TW) .................. 108146037

(51) Int. Cl.
*G06K 19/07* (2006.01)
*G06K 19/077* (2006.01)
*G06K 19/04* (2006.01)

(52) U.S. Cl.
CPC ....... *G06K 19/0705* (2013.01); *G06K 19/042* (2013.01); *G06K 19/0718* (2013.01); *G06K 19/07705* (2013.01)

(58) Field of Classification Search
CPC ............ G06K 19/0705; G06K 19/042; G06K 19/0718; G06K 19/07705
See application file for complete search history.

(56) References Cited

U.S. PATENT DOCUMENTS 5,396,443 A * 3/1995 Mese .................. G06F 1/324
  713/321
7,702,984 B1 * 4/2010 Lee .................. H01R 13/629
  714/742

(Continued)

FOREIGN PATENT DOCUMENTS

CN  108629276 A  10/2018
CN  109923503 A   6/2019

(Continued)

OTHER PUBLICATIONS

Extended European Search Report issued in corresponding EP application No. EP 20 19 8820, dated Mar. 9, 2021 (7 pages).

(Continued)

*Primary Examiner* — Daniel I Walsh
(74) *Attorney, Agent, or Firm* — Muncy, Geissler, Olds & Lowe, P.C.

(57) ABSTRACT

A smart card has a light-emitting element, a fingerprint sensor and a microcontroller. An operation of the smart card has a plurality of indication periods to indicate operation statuses of the smart card by the light-emitting element. The control method of the smart card includes generating a light source control signal, controlling a current supplied to the light-emitting element by the microcontroller according to the light source control signal, and decreasing the current supplied to the light-emitting element or stop the current supplied to the light-emitting element during at least one power-saving period in a first indication period of the plurality of indication periods.

16 Claims, 16 Drawing Sheets

(56) References Cited

U.S. PATENT DOCUMENTS

| | | | |
|---|---|---|---|
| 8,867,988 B2 | 10/2014 | Jolivet | |
| 9,361,441 B2 | 6/2016 | Partouche | |
| 10,182,328 B1* | 1/2019 | Maibach | G07G 3/00 |
| 10,528,857 B2* | 1/2020 | Okuno | G06K 19/0718 |
| 2004/0096086 A1* | 5/2004 | Miyasaka | G06F 21/83 |
| | | | 382/124 |
| 2004/0172541 A1* | 9/2004 | Ando | G06Q 20/40145 |
| | | | 713/176 |
| 2004/0184642 A1* | 9/2004 | Miyasaka | G06K 9/00087 |
| | | | 382/124 |
| 2004/0226999 A1 | 11/2004 | Ruat | |
| 2005/0150947 A1* | 7/2005 | Goodman | G06K 19/07354 |
| | | | 235/380 |
| 2005/0182927 A1* | 8/2005 | Shatford | G07F 7/1008 |
| | | | 713/159 |
| 2005/0194452 A1* | 9/2005 | Nordentoft | G06Q 20/40145 |
| | | | 235/492 |
| 2006/0095369 A1* | 5/2006 | Hoti | G06Q 20/10 |
| | | | 705/39 |
| 2007/0078780 A1* | 4/2007 | Tran | G06Q 40/02 |
| | | | 705/65 |
| 2007/0130414 A1* | 6/2007 | Ni | G06F 12/1416 |
| | | | 711/103 |
| 2007/0220272 A1* | 9/2007 | Campisi | G06Q 20/341 |
| | | | 713/186 |
| 2007/0220273 A1* | 9/2007 | Campisi | G06Q 20/3574 |
| | | | 713/186 |
| 2007/0283428 A1* | 12/2007 | Ma | G06F 21/78 |
| | | | 726/9 |
| 2008/0052452 A1* | 2/2008 | Chow | G06F 21/78 |
| | | | 711/103 |
| 2008/0082736 A1* | 4/2008 | Chow | G06F 12/0246 |
| | | | 711/103 |
| 2008/0120509 A1* | 5/2008 | Simon | G07C 9/257 |
| | | | 713/186 |
| 2008/0147964 A1* | 6/2008 | Chow | G06F 21/32 |
| | | | 711/103 |
| 2010/0250812 A1* | 9/2010 | Webb | G07F 7/1008 |
| | | | 710/301 |
| 2014/0117094 A1* | 5/2014 | Workley | G06K 19/0715 |
| | | | 235/492 |
| 2017/0038989 A1* | 2/2017 | Seo | G06F 21/645 |
| 2017/0231043 A1 | 8/2017 | Kluge | |
| 2018/0108018 A1* | 4/2018 | Lee | G06Q 20/4014 |
| 2018/0174013 A1* | 6/2018 | Lee | G06K 19/07707 |
| 2018/0232615 A1* | 8/2018 | Tarantino | G06K 19/07701 |
| 2018/0276518 A1* | 9/2018 | Benkley, III | G06K 9/00919 |
| 2019/0019195 A1* | 1/2019 | Dunjic | G06Q 20/4016 |
| 2019/0155429 A1* | 5/2019 | Kim | G06F 3/0421 |
| 2019/0244210 A1* | 8/2019 | Cheng | G06K 19/07705 |
| 2019/0392436 A1* | 12/2019 | Lee | G06K 19/07707 |
| 2020/0025345 A1* | 1/2020 | Liu | F21V 21/22 |
| 2020/0194846 A1* | 6/2020 | Yura | H01M 50/20 |
| 2020/0311509 A1* | 10/2020 | Benkley, III | G06K 9/00919 |
| 2020/0356745 A1* | 11/2020 | Yeh | G07C 9/26 |

FOREIGN PATENT DOCUMENTS

| | | |
|---|---|---|
| CN | 110313008 A | 10/2019 |
| CN | 203279280 U | 10/2019 |
| EP | 3104669 A1 | 12/2016 |
| TW | I638316 B | 10/2018 |

OTHER PUBLICATIONS

Office Action of the corresponding to Chinese application No. 202010002534.3 dated Feb. 2, 2021. (pp. 6).

* cited by examiner

US 11,068,764 B2

SMART CARD AND CONTROL METHOD THEREOF

This application claims priority for Taiwan patent application no. 108146037 filed on 16 Dec. 2019, the content of which is incorporated by reference in its entirely.

BACKGROUND OF THE INVENTION

Field of the Invention

The present invention relates to a smart card, particularly to a smart card with a visual indication function and a control method-thereof.

Description of the Related Art

In order to let a user know a present operation status of a smart card and guide the user to execute corresponding operations, light-emitting elements are arranged on the smart card for visual indication. Normally, light-emitting diodes (LED) are used as the light-emitting elements. FIG. 1 schematically shows a smart card 10 with a visual indication function, which comprises a LED 12, a microcontroller (MCU) 16 and a fingerprint sensor 18. The microcontroller 16 controls the turning on and off of the LED 12, and the fingerprint 18 is used to sense fingerprints.

Although the LED 12 helps the user know the operation status of the smart card, turning on the LED 12 may lead to power insufficiency of the smart card 10 while the microcontroller unit 16 or the fingerprint sensor 18 excutes a high current (high power consumption) operation. Power insufficiency may lower the processing efficiency of the smart card or even lead to the malfunction of the smart card.

SUMMARY OF THE INVENTION

One objective of the present invention is to provide a smart card with a visual indication function and a control method thereof.

According to one embodiment, the present invention proposes a smart card, which comprises a light-emitting element, a fingerprint sensor, and a microcontroller. The light-emitting element indicates operation statuses of the smart card in a plurality of indication periods, wherein a first indication period of the plurality of indication periods includes at least one power-saving period. The microcontroller is connected with the light-emitting element and the fingerprint sensor. According to a light source control signal, the microcontroller decreases a current supplied to the light-emitting element or stop supplying the current to the light-emitting element in the at least one power-saving period.

According to one embodiment, the present invention proposes a control method of a smart card. The smart card comprises a light-emitting element, a fingerprint sensor, and a microcontroller. An operation of the smart card has a plurality of indication periods to indicate operation statuses of the smart card by the light-emitting element. The control method comprises steps: generating a light source control signal; controlling a current supplied to the light-emitting element by the microcontroller, and the current supplied to the light-emitting element is decreased or zero in at least one power-saving period of a first indication period of the plurality of indication periods.

The present invention determines the current supplied to the light-emitting element according to the total operation current of the smart card, the operation current of the fingerprint sensor, or the operation current of the microcontroller, whereby to prevent the smart card from power insufficiency.

DETAILED DESCRIPTION OF THE INVENTION

Figure 2:
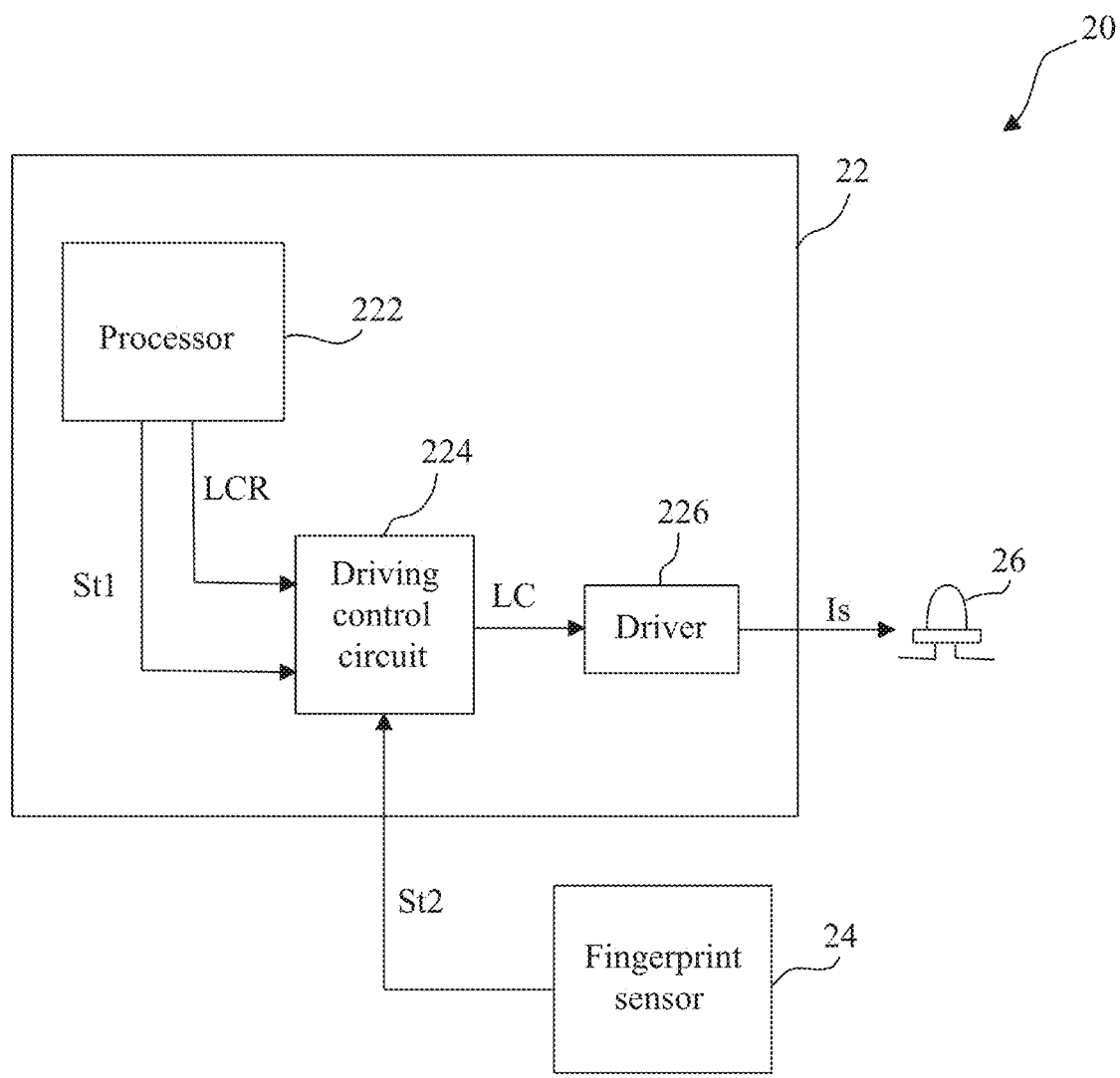
FIG. 2 schematically shows a smart card according to a first embodiment of the present invention.

FIG. 2 schematically shows a smart card according to a first embodiment of the present invention. The smart card 20 in FIG. 2 comprises a microcontroller 22, a fingerprint sensor 24, and a LED 26. The microcontroller 22 is connected with the fingerprint sensor 24 and the LED 26. The LED 26 is a light-emitting element and is used to provide visual indication. The microcontroller 22 controls the turning on or off of the LED 26. The fingerprint sensor 24 is used to sense fingerprints. The microcontroller 22 includes a processor 222, a driving control circuit 224, and a driver 226. The driver 226 is connected with the LED 26 and supplies a current Is to drive the LED 26. The driving control circuit 224 is connected with the processor 222, the fingerprint sensor 24 and the driver 226. The processor 222 provides a light source control reference signal LCR and a first timing signal St1 to the driving control circuit 224. The fingerprint sensor 24 provides a second timing signal St2 to the driving control circuit 224. The driving control circuit 224 generates a light source control signal LC according to the light source control reference signal LCR, the first timing signal St1 and the second timing signal St2. The first timing signal St1 is associated with the operation current of the microcontroller 22. The second timing signal St2 is associated with the operation current of the fingerprint sensor 24. The light source control reference signal LCR may be regarded as a preset signal for controlling the LED 26.

Figure 1:
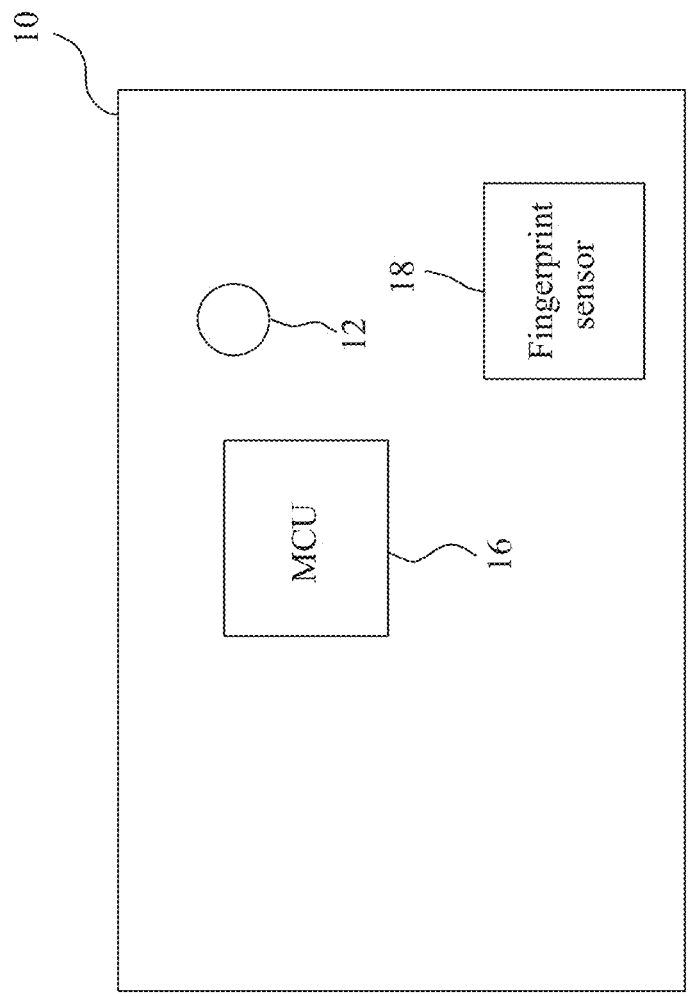
FIG. 1 schematically shows a conventional smart card with a visual indication function.
Figure 3:
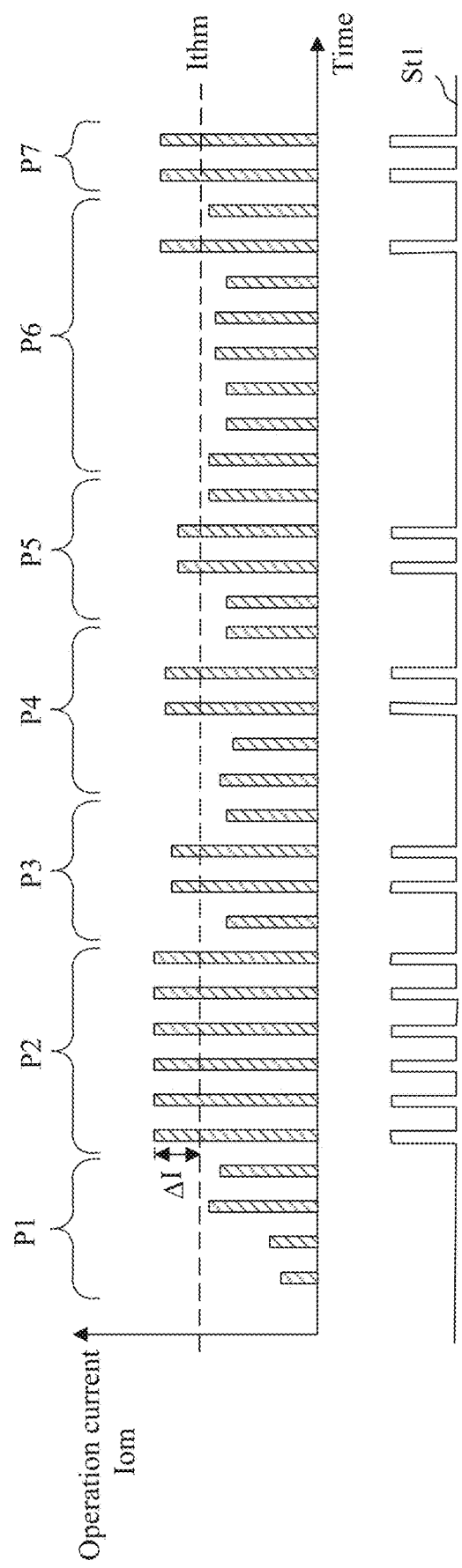
FIG. 3 schematically shows the operation current and the first timing signal St1 of the conventional microcontroller.

FIG. 3 schematically shows the operation currents Iom of the microcontroller 16 of FIG. 1 in a plurality of different procedures P1-P7 in the conventional technology. The first timing signal St1 is designed according to the operation currents Iom. While the operation current Iom is greater than or equal to a first preset value Ithm, the first timing signal St1 is "1" (High). While the operation current Iom is smaller than the first preset value Ithm, the first timing signal St1 is "0" (Low). The condition that the operation current Iom exceeds the first preset value Ithm indicates higher current consumption of the microcontroller 16, and the smart card may be needs a power-saving mechanism to avoid power insufficiency. According to the present invention, the designer of the microcontroller 22 can determine the first timing signal St1 according to the time point that the operation current Iom is greater than the first preset value Ithm. The designer of the microcontroller 22 can incorporate the program code of generating the first timing signal St1 into the firmware of the microcontroller 22, wherein the firmware is used to execute the procedures P1-P7. Thus, the microcontroller 22 will generate the first timing signal St1 when executing the procedures P1-P7. Similarly; according to the operation current Ios of the fingerprint sensor 24 in a plurality of different procedures and the time point that the operation current Ios is greater than or equal to a second preset value Iths, the designer of the fingerprint sensor 24 can determine a second timing signal St2. The designer of the fingerprint sensor 24 can incorporate the program code of generating the second timing signal St2 in the firmware of the fingerprint sensor 24. Thus, the fingerprint sensor 24 will generate the second timing signal St2 when the firmware of the fingerprint sensor 24 executes the procedures.

While the first timing signal St1 or the second timing signal St2 is at a high level, it means that the microcontroller or the fingerprint sensor consumes a higher current. Temporarily turning off the LED of the smart card can prevent from power insufficiency of the smart card. In the embodiment of FIG. 2, the driving control circuit 224 generates the light source control signal LC according to the light source control reference signal LCR, the first timing signal St1 and the second timing signal St2. The driver 226 generates a current Is according to the light source control signal LC to drive the LED 26 and control the turning on or off of the LED 26.

Figure 4:
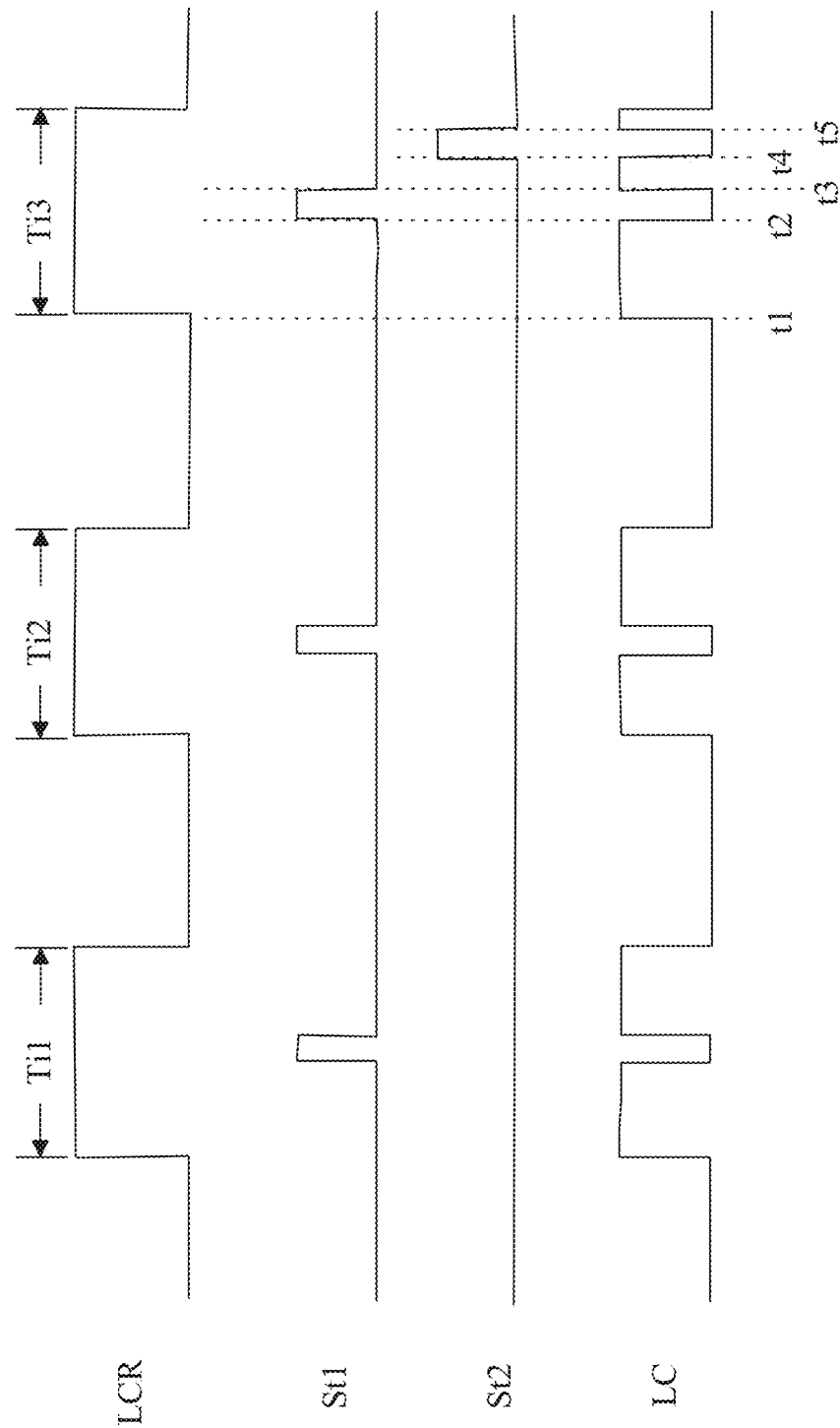
FIG. 4 schematically shows the waveforms of the light source control reference signal LCR, the light source control signal LC, the first timing signal St1 and the second timing signal St2 in FIG. 2.
Figure 5:
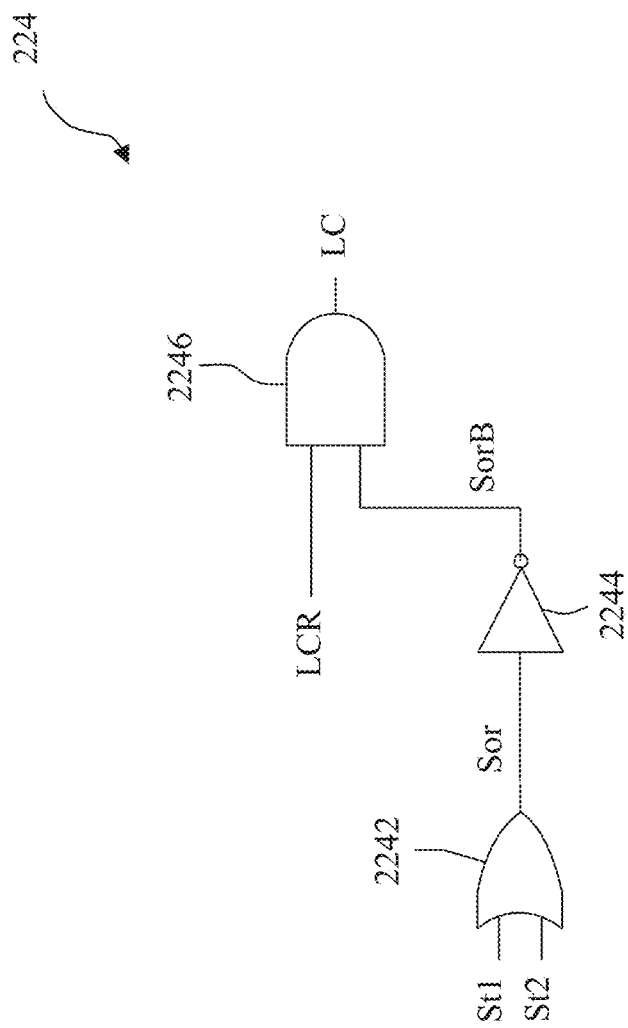
FIG. 5 schematically shows an embodiment of the driving control circuit.

The light source control reference signal LCR is set in advance according to the procedures to be executed by the microcontroller 22 and the fingerprint sensor 24 (such as registering and comparison of fingerprints). The processor 222 sends out the corresponding light source control reference signal LCR according to the procedure executed by the microcontroller 22 and the fingerprint sensor 24. FIG. 4 schematically shows the waveforms of the light source control reference signal LCR and the light source control signal LC in FIG. 2. FIG. 5 schematically shows an embodiment of the driving control circuit 224. In the embodiment shown in FIG. 5, the driving control circuit 224 includes an OR gate 2242, a inverter 2244, and an AND gate 2246. The inverter 2244 is connected between the output terminal of the OR gate 2242 and the input terminal of the AND gate 2246. The OR gate 2242 receives the first timing signal SU and the second timing signal St2 to generate a signal Sor. The inverter 2244 receives the signal Sor to generate a signal SorB. The AND gate 2246 receives the light source control reference signal LCR and the signal SorB to generate the light source control signal LC. Refer to FIG. 4 and FIG. 5. The operation of the smart card 20 includes a first indication period Ti1, a second indication period Ti2, and a third indication period Ti3. The indication periods Ti1 are used to indicate the operation statuses of the smart card 20 by the LED26. In each indication period, the light source control reference signal LCR is "I" The first indication period Ti1, the second indication period Ti2 and the third indication period Ti3 have the same time length. At time t1, the light source control reference signal LCR is "1" and both the first timing signal St1 and the second timing signal St2 are "0". Thus, the signal SorB is "1", and the light source control signal LC is "1". Consequently, the LED 26 is turned on. During the interval between the time t2 and the time t3, the light source control reference signal LCR is still "1", but the first timing signal St1 becomes "1". Thus, the light source control signal LC becomes "0", the LED 26 is turned off. During the interval between the time t3 and the time t4, the light source control reference signal LCR is "1", the first timing signal St1 returns to "0", and the second timing signal St2 is "0", Thus, the light source control signal LC becomes "1", and the LED 26 is turned on. During the interval between the time t4 and the time t5, the light source control reference signal LCR is "1", and the second timing signal St2 is "1". Thus, the light source control signal LC becomes "0", and the LED 26 is turned off. The interval between the time t2 and the time t3 and the interval between the time t4 and the time t5 can be regarded as the power-saving periods, in which the LED 26 is turned off for saving the power of the smart card 20. In one embodiment, the length of a power-saving period is shorter than 30 ms, From FIG. 4, it is known that the LED 26 is turned off during the interval between time t2 and time t3 and the interval between time t4 and time t5. The interval between time t2 and time t3 and the interval between time t4 and time t5 are very short. In fact, it is shorter than the time of persistence of vision 100 ms. Therefore, the user will not perceive that the LED 26 is momentarily turned off in other words, the user will feel that the LED 26 is always lightened in the third indication period Ti3. The light source control signal LC is generated according to the first timing signal St1 and the second timing signal St2. While the light source control signal LC is at a level of "0", it means that the microcontroller 22 or the fingerprint sensor 24 consumes a higher current. In such a moment, turning off the LED 26 can prevent the smart card 20 from power insufficiency.

Figure 6:
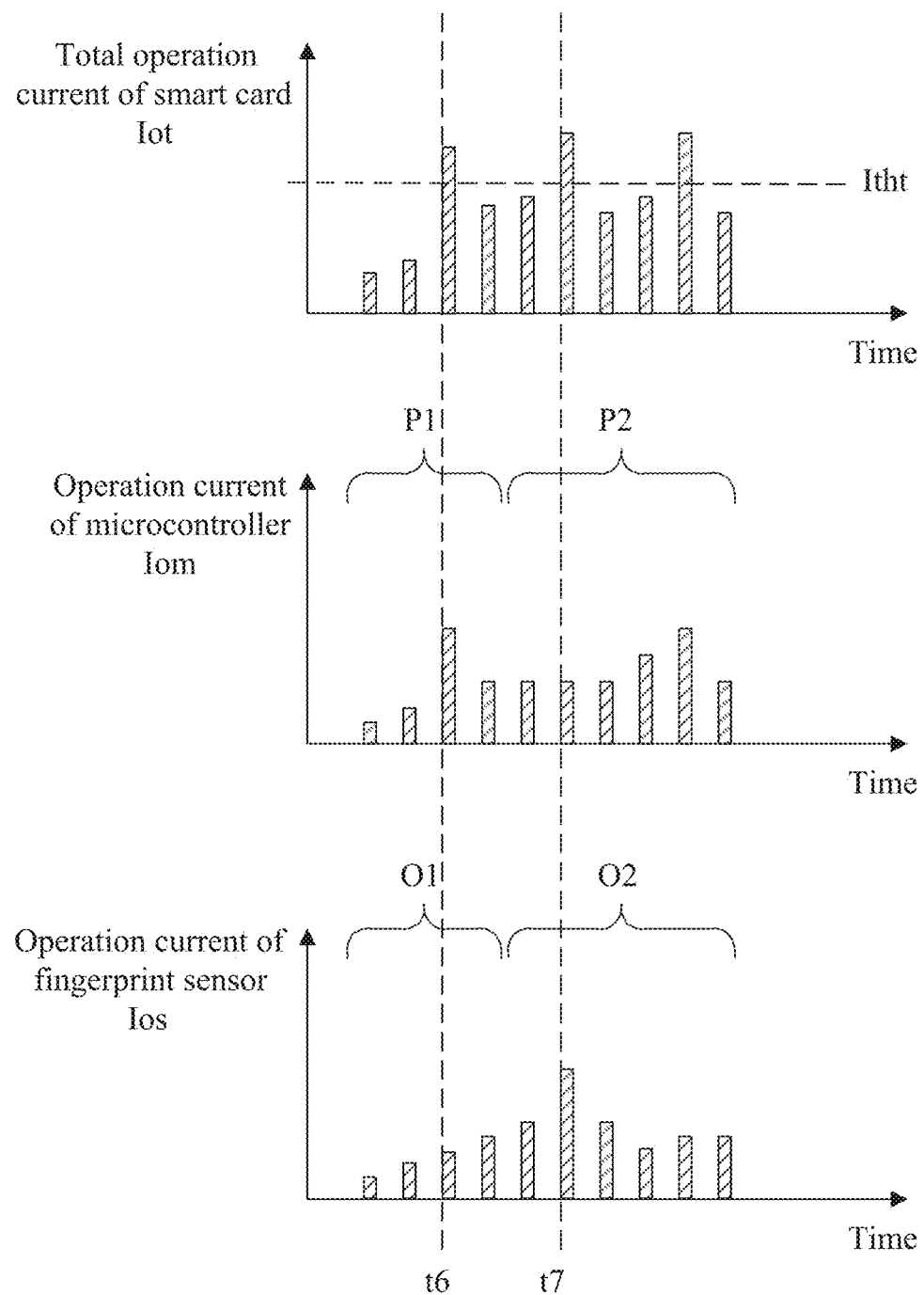
FIG. 6 schematically shows the total operation current of the smart card, the operation current of the microcontroller and the operation current of the fingerprint sensor in the conventional smart card.

In other embodiments, the designer of the microcontroller 22 can determine the first timing signal St1 and the second timing signal St2 via observing the total operation current Iot of the smart card 10. The total operation current Tot of the smart card 10 includes the operation current Iom of the microcontroller 22 and the operation current Ios of the fingerprint sensor 24. FIG. 6 schematically shows the total operation current Iot of the smart card 10, the operation current Torn of the microcontroller 16 and the operation current Ios of the fingerprint sensor 18 in the conventional technology. The three currents can be measured in a laboratory via detecting the smart card 10. While the total operation current Iot is greater than or equal to a third preset value Itht, it means that the smart card 10 consumes a higher current and power insufficiency may occur. By comparing the operation current Iom, the operation current Ios and the total operation current Tot, it can be determined the microcontroller 16 or the fingerprint sensor 18 makes the total operation current Iot become greater than or equal to a third preset value Itht. For example, at the time t6 and time t7, the total operation current Iot is greater than the third preset value Itht. At the time t6, the operation current Iom of the microcontroller 16 is greater than the operation current Ios of the fingerprint sensor 18. It means that the total operation current Iot of the smart card 10 greater than the third preset value Itht at the time t6 is mainly caused by the microcontroller 22. According to the time point that the microcontroller 16 causes the total operation current Iot of the smart card 10 to be greater than the third preset value Itht, the designer of the microcontroller 22 can determine the first timing signal St1 and incorporate the program code of generating the first timing signal St1 into the firmware of the processor 222. At the time t7, the operation current Ios of the fingerprint sensor 18 is greater than the operation current Iom of the microcontroller 16. It indicates that the total operation current Iot of the smart card 10 greater than the third preset value Itht at the time t7 is mainly caused by the fingerprint sensor 18. According to the time point that the fingerprint sensor 18 causes the total operation current Iot of the smart card 10 to be greater than the third preset value Itht, the designer of the fingerprint sensor 24 can determine the second timing signal St2 and incorporate the program code of generating the second timing signal St2 into the firmware of the fingerprint sensor 24. In other embodiments, the processor 222 may use a timer to generate the first timing signal St1 and the fingerprint sensor 24 may use a timer to generate the second timing signal St2, wherein the first timing signal St1 and the second timing signal St2 are set to become "1" or "0" at preset time points.

Figure 7:
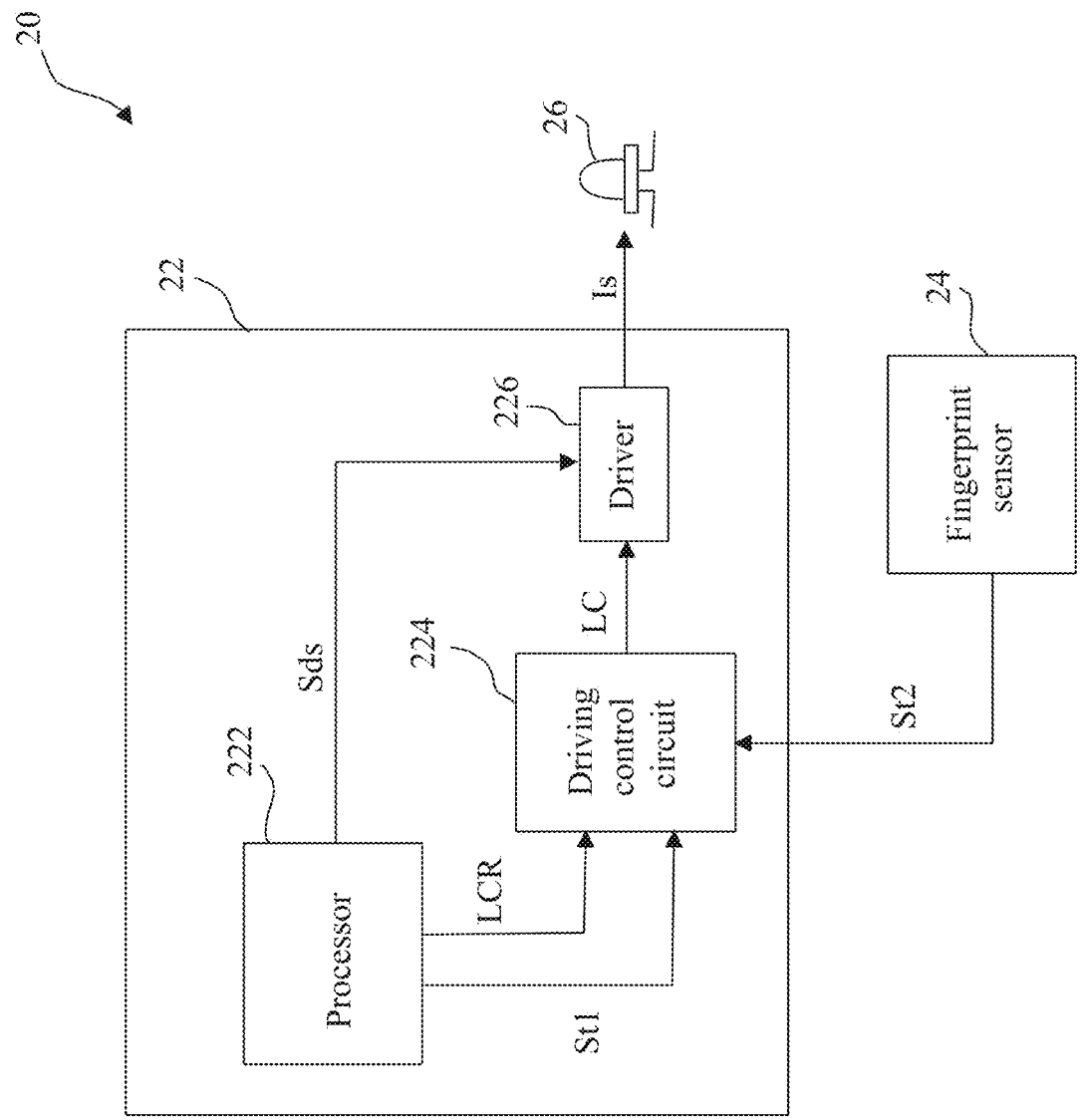
FIG. 7 schematically shows a smart card according to a second embodiment of the present invention.
Figure 8:
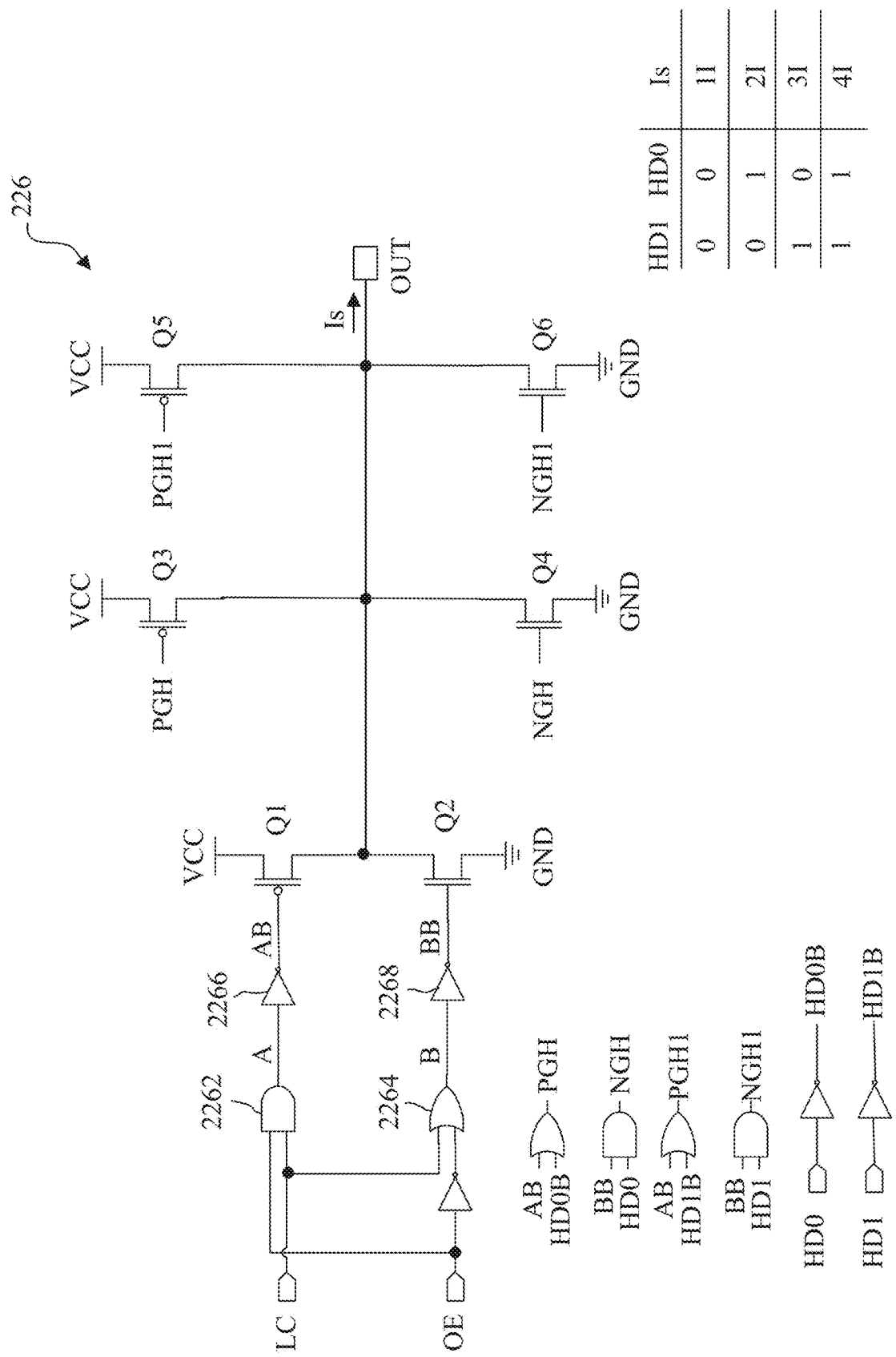
FIG. 8 schematically shows an embodiment of the driver in FIG. 7.

FIG. 7 schematically shows a smart card according to a second embodiment of the present invention. In comparison with the embodiment shown in FIG. 2, a selection signal Sds is used to determine the value of the current Is in the smart card 20 of FIG. 7. In the embodiment shown in FIG. 7, the processor 222 provides the selection signal Sds to the driver 226. According to the light source control signal LC and the selection signal Sds, the driver 226 provides the current Is to the LED 26. FIG. 8 schematically shows an embodiment of the driver 226 in FIG. 7. Two input terminals of the driver 226 respectively receives the light source control signal LC and an enabling signal QE, and an output terminal OUT of the driver 226 is connected with the LED 26. The enabling signal OE is used to enable the driver 226. In FIG. 8, transistors Q1 and Q2 form a first current source. Transistors Q3 and Q4 form a second current source. Transistors Q5 and Q6 form a third current source. The aspect ratio of channel of the transistors Q2 and Q1 are are the same. The aspect ratio of channel of the second transistor Q5 is twice the aspect ratio of channel of the transistor Q1. The first current source provides a current of I, the second current source provides a current of I, and the third current source provides a current of 2 I. By controlling the transistors Q1-Q6, four different currents Is can be acquired.

In the embodiment shown FIG. 8, the selection signal Sds includes two bits HD0 and HID1. The symbol "A" represents the output of the AND gate 2262. The symbol "B" represents the output of the OR gate 2264. The symbol "AB" represents the output of the inverter 2266. The symbol "BB" represents the output of the inverter 2268. FIG. 8 also shows how to generate the control signals PGH, PGH1, NGH and NGH1, which are used to control the turning on/off of the transistors Q3-Q6. The persons skilled in the art should be able to implement the driver 226 of the present invention according to FIG. 8. While the bit HD1 is "0" and the bit HD0 is also "0", the driver 226 provides a current Is of I. While the bit HD1 is "0" and the bit HD0 is "1", the driver 226 provides a current Is of 2 I. While the bit HD1 is "1" and the bit HD0 is "0", the driver 226 provides a current Is of 3 I. While the bit Hal is "1" and the bit HD0 is also "1", the driver 226 provides a current is of 4 I. Thus, by supplying the selection signal Sds to the driver 226 of FIG. 8, the driver 226 may adjust the current Is to the LED 26. The circuit shown in FIG. 8 is only to exemplify how to adjust the current Is but not to limit the scope of the present invention.

The current of the smart card at different time points can be obtained by detecting the smart card in a laboratory in advance. Therefore, the firmware of the processor 222 can be designed to provide appropriate selection signals Sds to the driver 226 at specified time points lest the total current Iot of the smart card exceed the third preset value Itht.

Figure 9:
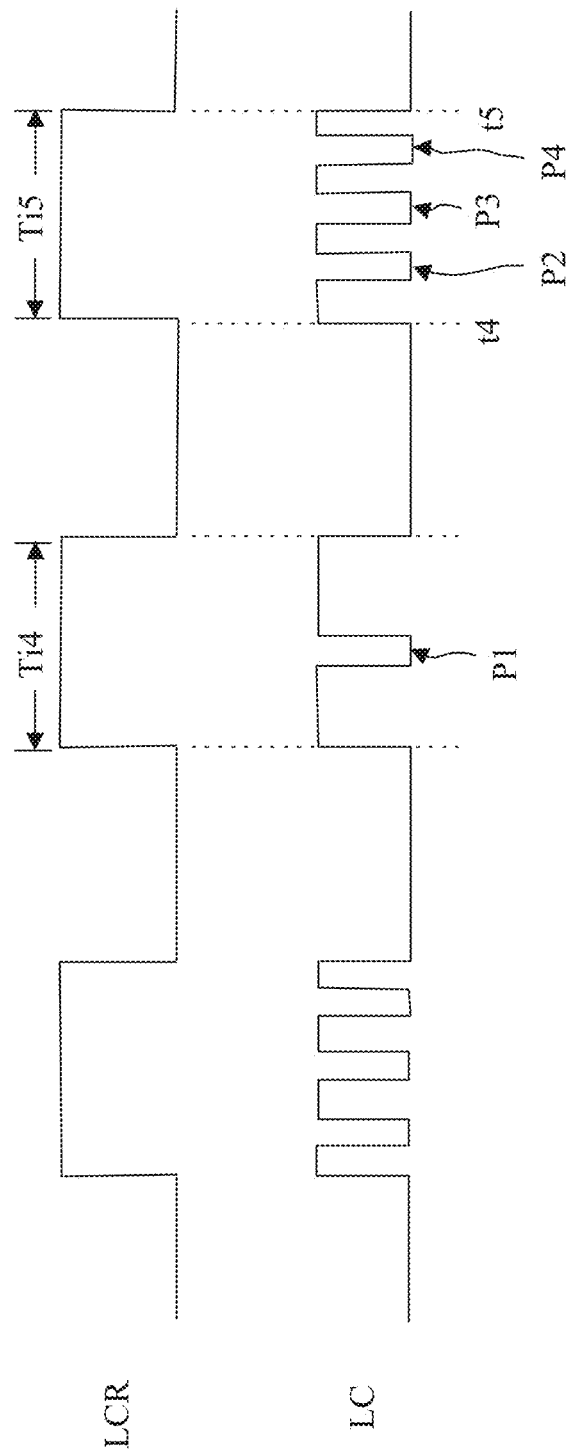
FIG. 9 schematically shows the waveforms of the light source control reference signal LCR and the light source control signal LC in FIG. 7.

The selection signal Sds in FIG. 7 is used to select the driving current Is. Different selection signals Sd may be used to supply different currents Is to the LED 26 in different indication periods or at different time points. In FIG. 9, a fourth indication period Ti4 and a fifth indication period Ti5 have the same time length. The fourth indication period Ti4 has a power-saving period. P1. In the power-saving period P1, the light source control signal LC is "0", so as to turn off the LED 26. In other words, the LED 26 is turned off one time in the first indication period Ti4. In the fourth indication period Ti4, while the light source control signal LC is "1", the current supplied to the LED 26 is 14. The fifth indication period Ti5 has three power-saving periods P2-P4. In other words, the LED 26 is turned off three times in the fifth indication period Ti5. In the fifth indication period Ti5, while the light source control signal. LC is "1", the current supplied to the LED 26 is 15. The times of turning off the LED 26 in the fifth indication period Ti5 are more than the times of turning off the LED 26 in the fourth indication period Ti4. According to the present invention, the current I5 is greater than the current I4, whereby the user will feel that the brightness of the LED 26 in the fifth indication period Ti5 is almost the same as the brightness of the LED 26 in the fourth indication period Ti4. The abovementioned method that uses the selection signals to adjust the driving current supplied to the LED is also applicable to the embodiments described thereinafter. In the embodiment shown in FIG. 2 or FIG. 9, the current Is, which the driver 226 supplies to the LED 26, is lowered to zero to make the LED 26 turn off in the power-saving period. In other embodiments, the current Is, which the driver 226 supplies to the LED 26, is smaller but not zero in the power-saving period. In other words, the driver 226 does not turn off the LED 26 but only decreases the current supplied to the LED 26.

Figure 10:
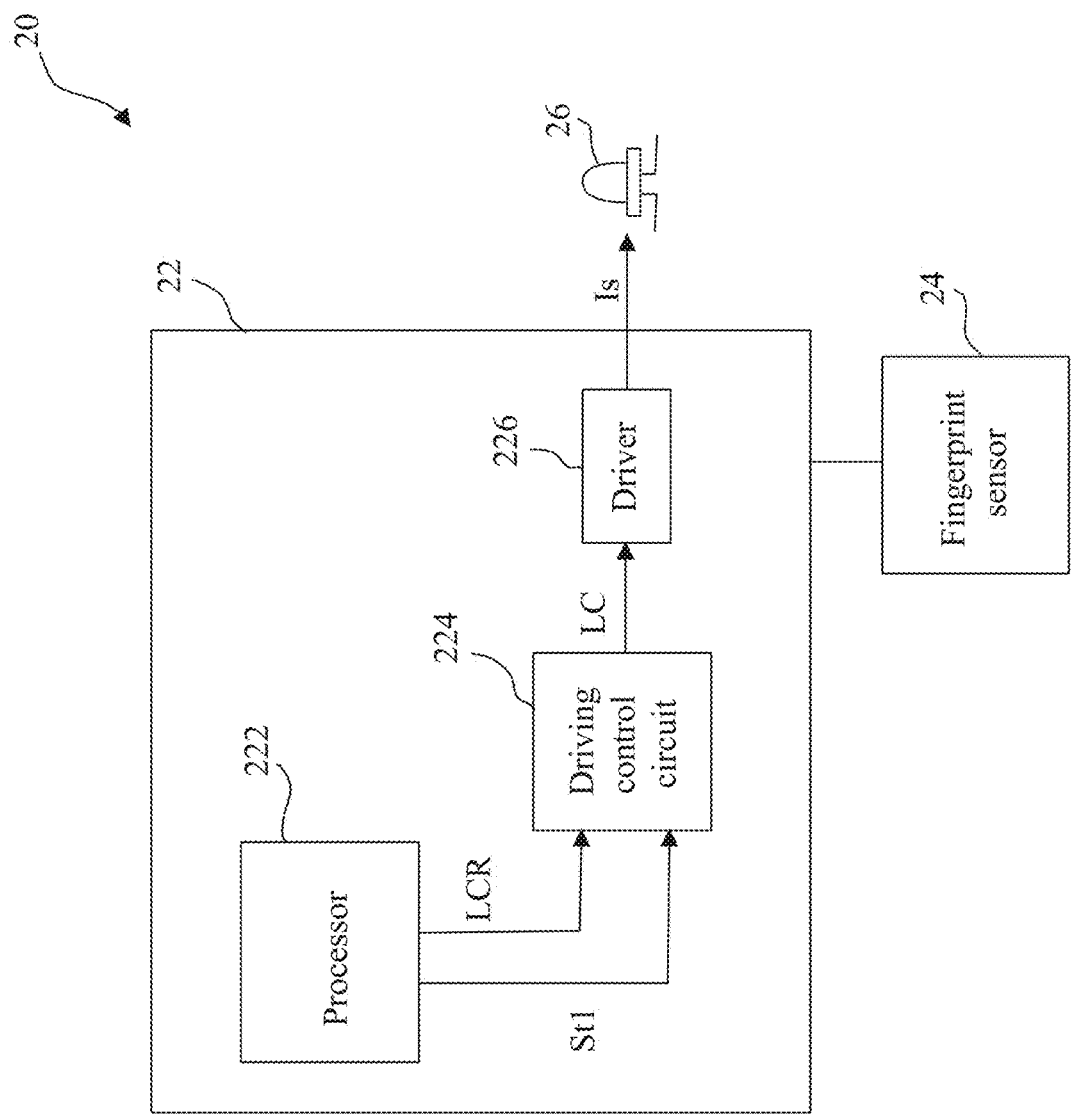
FIG. 10 schematically shows a smart card according to a third embodiment of the present invention.

FIG. 10 schematically shows a smart card according to a third embodiment of the present invention. The smart card 20 in FIG. 10 is different from the smart card 20 in FIG. 2 in that the fingerprint sensor 24 in FIG. 10 does not provides the second timing signal St2. In FIG. 10, the driving control circuit 224 generates the light source control signal LC according to the light source control reference signal LCR and the first timing signal St1. In the embodiment shown in FIG. 10, the first timing signal St1 is determined beforehand according to the maximum operation current of the fingerprint sensor 24 in practical operation. For example, the operation current Ioin of the microcontroller 16 and the operation current Ios of the fingerprint sensor 24 in the practical operation of the smart card 10 may be detected beforehand in a laboratory, and the maximum value Iosmax of the operation current Ios of the fingerprint sensor 16 can be found out therefrom. Suppose that the smart card 10 can provide a maximum current Imax of 12 mA and that Iosmax is 7 mA. According to the time point that the operation current Iom of the microcontroller 16 is greater than or equal to 5 mA, the designer of the microcontroller 22 can determine the first timing signal St1 and incorporate the program code of generating the first timing signal St1 into the firmware of the microcontroller 22. Thereby; while the operation current Iom of the microcontroller 22 is greater than or equal to 5 mA, the first timing signal St1, which is sent out by the processor 222, changes from "0" to "1" so as to lower the current Is supplied to the LED 26 lest the total operation current of the smart card 20 exceed the tolerable current 12 mA of the smart card 20.

Figure 11:
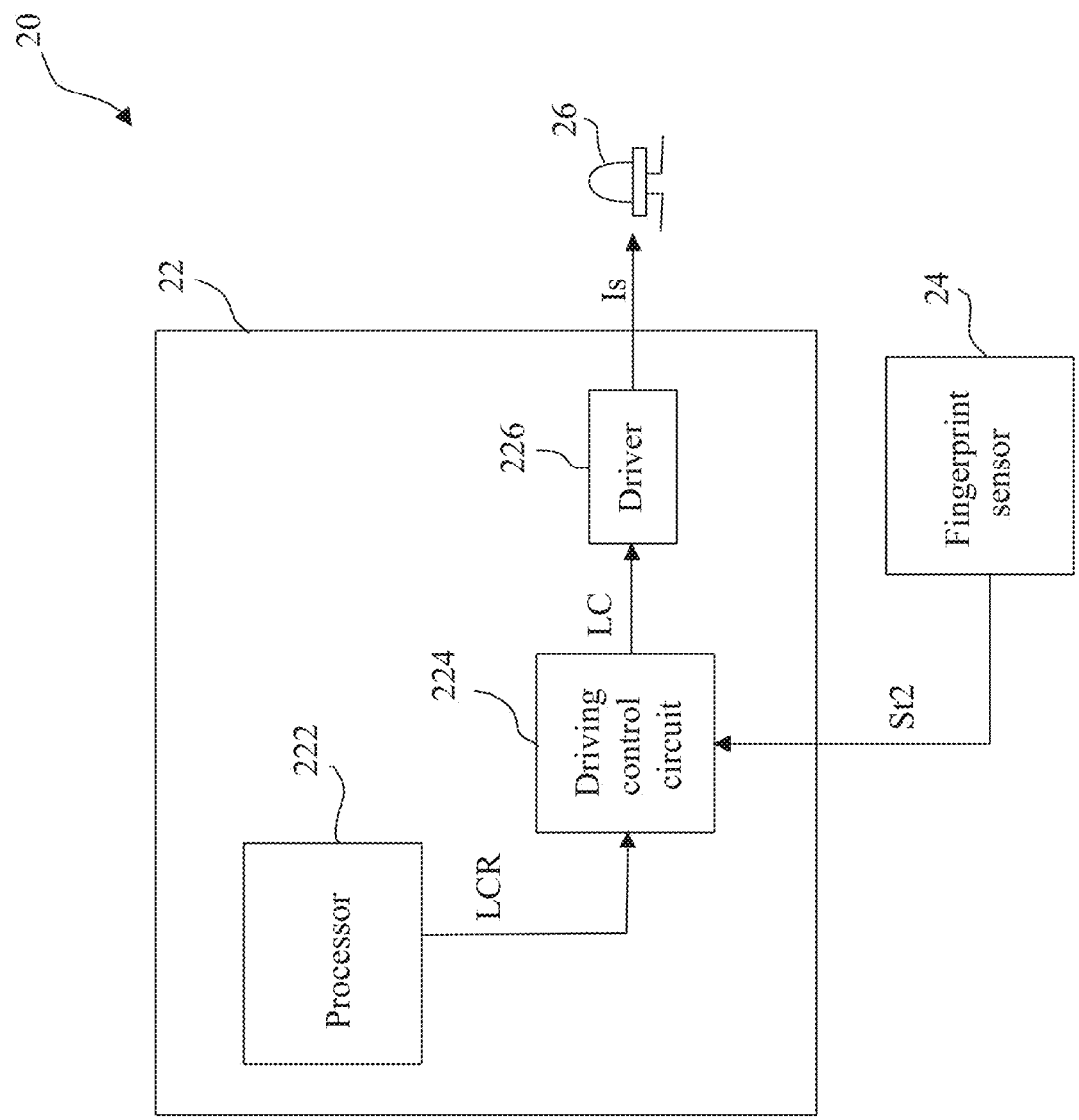
FIG. 11 schematically shows a smart card according to a fourth embodiment of the present invention.

FIG. 11 schematically shows a smart card according to a fourth embodiment of the present invention. The smart card 20 in FIG. 11 is different from the smart card 20 in FIG. 2 in that the processor 222 in FIG. 11 does not provide the first timing signal St1. In FIG. 11, the driving control circuit 224 generates the light source control signal LC according to the light source control reference signal LCR and the second timing signal St2. In the embodiment shown in FIG. 11, the second timing signal St2 is determined beforehand according to the maximum operation current of the microcontroller 22 in practical operation. For example, the operation current Iom of the microcontroller 16 and the operation current Ios of the fingerprint sensor 24 in the practical operation of the smart card 10 can be detected beforehand in a laboratory, and the maximum value Iommax of the operation current Iom of the microcontroller 16 can be found out therefrom. Suppose that the smart card 10 can provide a maximum current Imax of 12 mA and that Iommax is 7 mA. According to the time point that the operation current of the fingerprint sensor 18 is greater than or equal to 5 mA, the designer of the fingerprint sensor 24 can determine the second timing signal St2 and incorporate the program code of generating the second timing signal St2 into the firmware of the fingerprint sensor 24. Thereby, while the operation current Ios of the fingerprint sensor 24 is greater than or equal to 5 mA, the second timing signal St2, which is sent out by the fingerprint sensor 24, changes from "0" to "1" so as to lower the current Is supplied to the LED 26 lest the total operation current of the smart card 20 exceed the tolerable current 12 mA of the smart card 20.

Figure 12B:
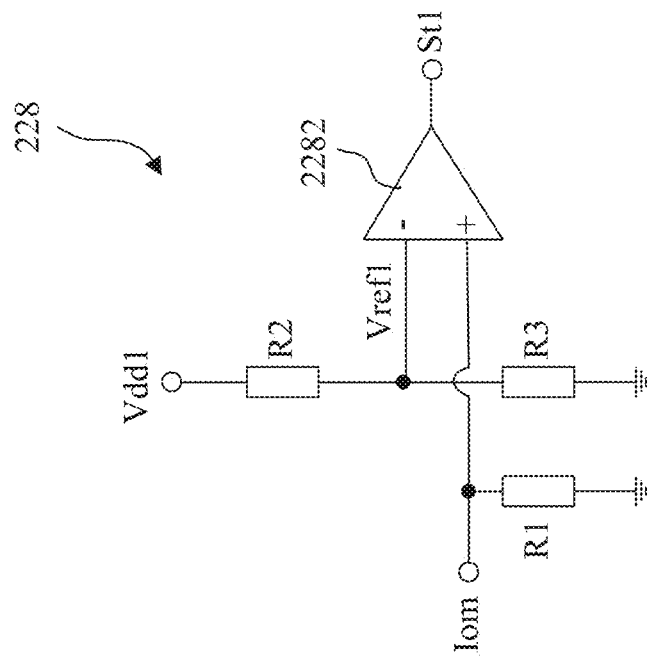
FIG. 12B schematically shows an embodiment of the first timing signal generation unit in FIG. 12A.
Figure 12A:
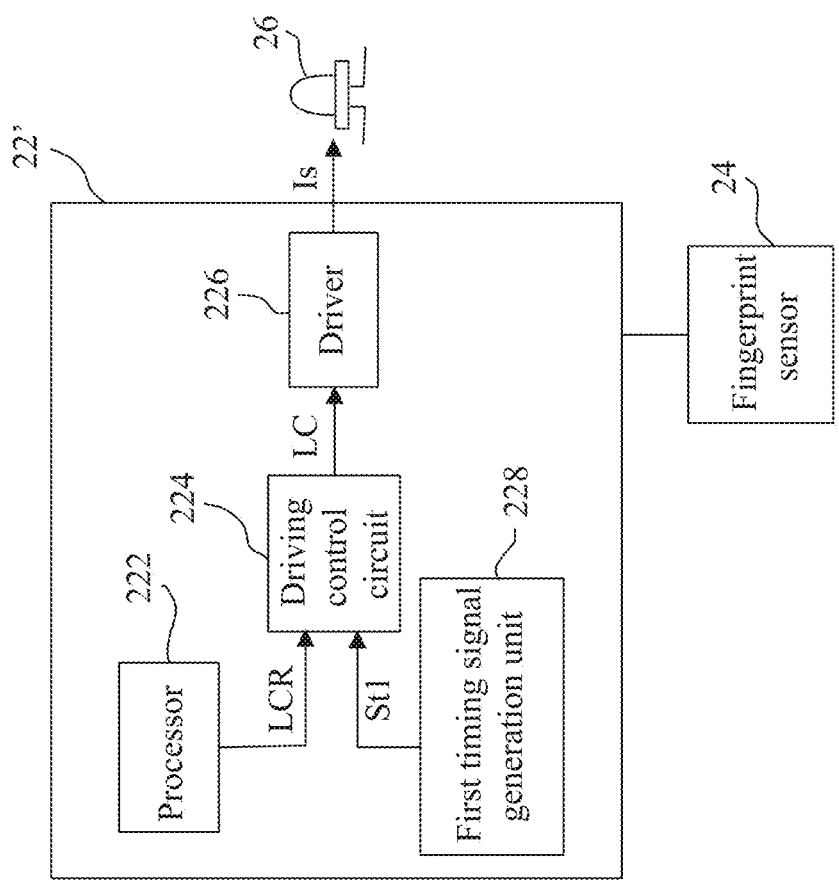
FIG. 12A schematically shows another embodiment of the microcontroller in FIG. 10.

In other embodiments, a first timing signal generation unit arranged in the microcontroller to provide the first timing signal St1. As shown in FIG. 12A, the microcontroller 22' is similar to the microcontroller 22 in FIG. 10. The microcontroller 22' further includes a first timing signal generation unit 228. The first timing signal generation unit 228 is connected with the driving control circuit 224 and configured to provide the first tinning signal St1 to the driving control circuit 224. The first timing signal generation unit 228 detects the operation current Iom of the microcontroller 22' and generates the first timing signal St1 according to the detected operation current Iom. FIG. 12B schematically shows an embodiment of the first timing signal generation unit 228. The first timing signal generation unit 228 includes a comparator 2282. The comparator 2282 has a non-inverting input terminal connected with a resistor R1, and an inverting input terminal connected a node between a resistor R2 and a resistor R3, One end of the resistor R1 is connected with the comparator 2282 and receives the operation current Iom of the microcontroller 22', and the other end of the resistor R1 is grounded, One end of the resistor R2 is connected with a power source Vdd1, and the other end of the resistor R2 is connected with the comparator 2282. One end of the resistor R3 is connected with the comparator 2282, and the other end of the resistor R3 is grounded. The output terminal of the comparator 2282 provides the first timing signal St1. The combination of the resistors R2 and R3 is used to provide a reference voltage Vref1 for the inverting input terminal of the comparator 2282. While the operation current Iom of the microcontroller 22' is greater than Vref1/R1 (equivalent to the first preset value Ithm), the first timing signal St1 is "1". While the operation current Iom of the microcontroller 22' is smaller than or equal to Vref1/R1, the first timing signal St1 is "0". The first timing signal generation unit 228 is equivalent to a current comparator. While the operation current Ioin of the microcontroller 22' is greater than a threshold value (such as the first preset value Ithm), the first timing signal St1, which is output by the first timing signal generation unit 228, is "1".

Figure 13:
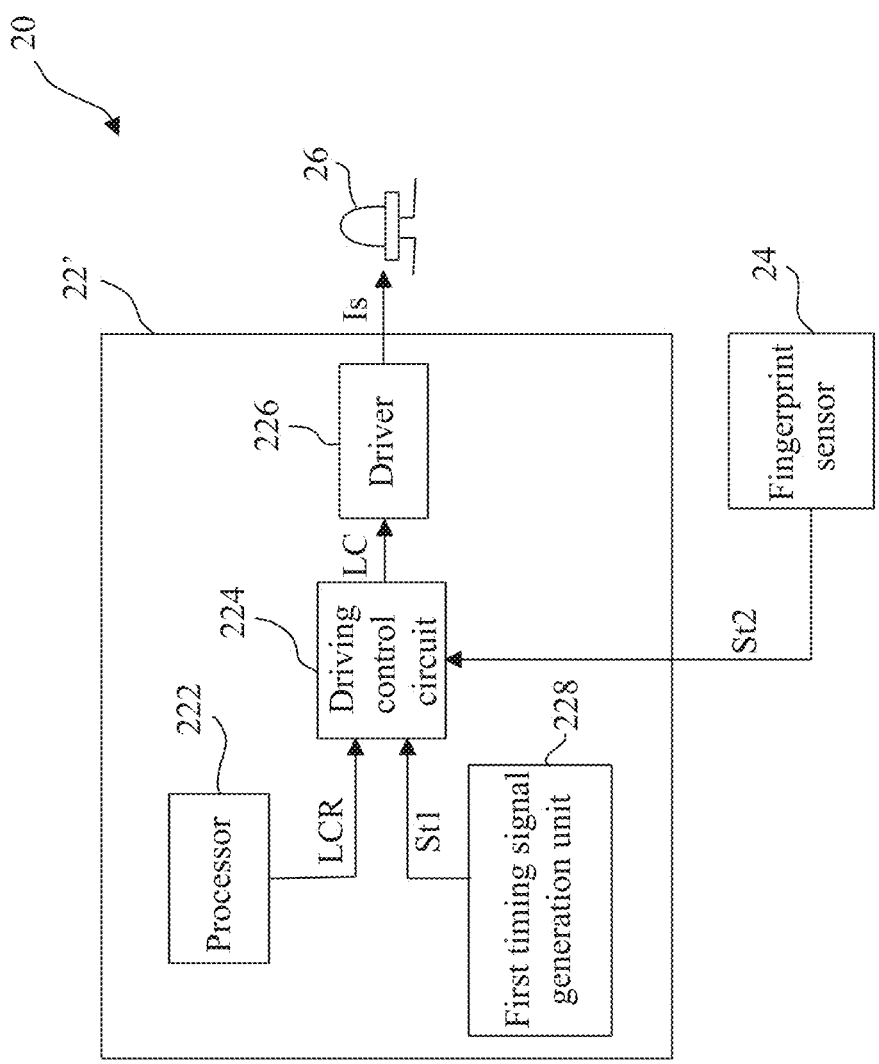
FIG. 13 schematically shows another embodiment of the microcontroller in FIG. 2.

The microcontroller 22' in FIG. 12A is also applicable to the embodiments shown in FIG. 2 and FIG. 7. Refer to FIG. 13. The microcontroller 22' in FIG. 13 is similar to the microcontroller 22 in FIG. 2 except the microcontroller 22' in FIG. 13 further includes a first timing signal generation unit 228 configured to provide the first timing signal SU for the driving control circuit 224. The first timing signal generation unit 228 detects the operation current Iom of the microcontroller 22' and generates the first timing signal St1 according to the detected operation current Iom.

Figure 14B:
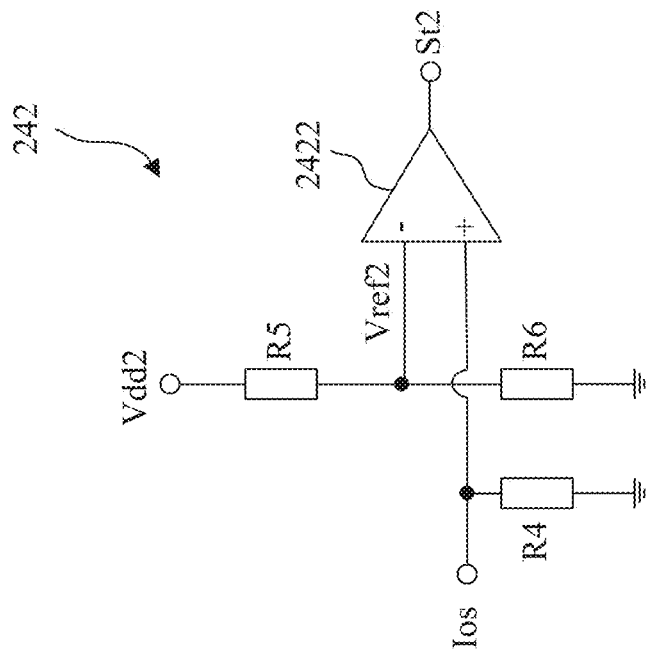
FIG. 14B schematically shows an embodiment of the second timing signal generation nit in FIG. 14A.
Figure 14A:
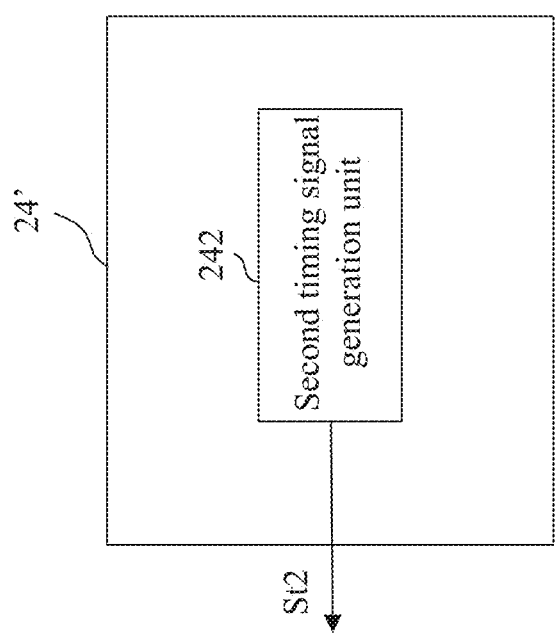
FIG. 14A schematically shows an embodiment of the fingerprint sensor in FIG. 2.

In other embodiments, a second timing signal generation unit is arranged in the fingerprint sensor to provide the second timing signal St2. As shown in FIG. 14A, the fingerprint sensor 24' is similar to the fingerprint sensor 24 in FIG. 2, The fingerprint sensor 24' further includes a second timing signal generation unit 242. The second timing signal generation unit 242 is connected with the driving control circuit 224 and configured to provide the second timing signal St2 for the driving control circuit 224. The second timing signal generation unit 242 detects the operation current Ios of the fingerprint sensor 24' and generates the second timing signal St2 according to the detected operation current Ios. FIG. 14B schematically shows an embodiment of the second timing signal generation unit 242. The second timing signal generation unit 242 includes a comparator 2422, The comparator 2422 has a non-inverting input terminal connected with a resistor R4 and an inverting input terminal connected a node between a resistor R5 and a resistor R6, One end of the resistor R4 is connected with the comparator 2422 and receives the operation current Ios of the fingerprint sensor 24', and the other end of the resistor R4 is grounded. One end of the resistor R5 is connected with a power source Vdd2, and the other end of the resistor R5 is connected with the comparator 2422. One end of the resistor R6 is connected with the comparator 2422, and the other end of the resistor R6 is grounded. The output terminal of the comparator 2422 provides the second timing signal St2. The combination of the resistors R5 and R6 is used to provide a reference voltage Vref2 for the inverting input terminal of the comparator 2422. While the operation current Ios of the fingerprint sensor 24' is greater than Vref2/R4 (equivalent to the second preset value Iths), the second timing signal St2 is "1". While the operation current Ios of the fingerprint sensor 24' is smaller than or equal to Vref2/R4, the second timing signal St2 is "0". The second timing signal generation unit 242 is equivalent to a current comparator. While the operation current Ios of the fingerprint sensor 24' is greater than a threshold value (such as the second preset value Iths), the second timing signal St2, which is output by the second timing signal generation unit 242, is "1". The fingerprint sensor 24' in FIG. 14A is also applicable to the embodiments shown in FIG. 70 and FIG. 11. In other words, the fingerprint sensor 24' may replace the fingerprint sensor 24 in FIG. 7 or FIG. 11.

In the abovementioned embodiments, the first timing signal St1 is associated with the power consumption of the microcontroller, and the second timing signal St2 is associated with the power consumption of the fingerprint sensor. In the abovementioned embodiments, the light source control signal LC is generated according to the power consumption-related timing signals provided by the microcontroller and/or the fingerprint sensor and the light source control reference signal LCR to turn on or off the LED 26 in an indication period. In the embodiment shown in FIG. 15, the light source control signal LC is set beforehand, and it is unnecessary for the microcontroller and the fingerprint sensor to provide the power consumption-related timing signals.

Figure 15:
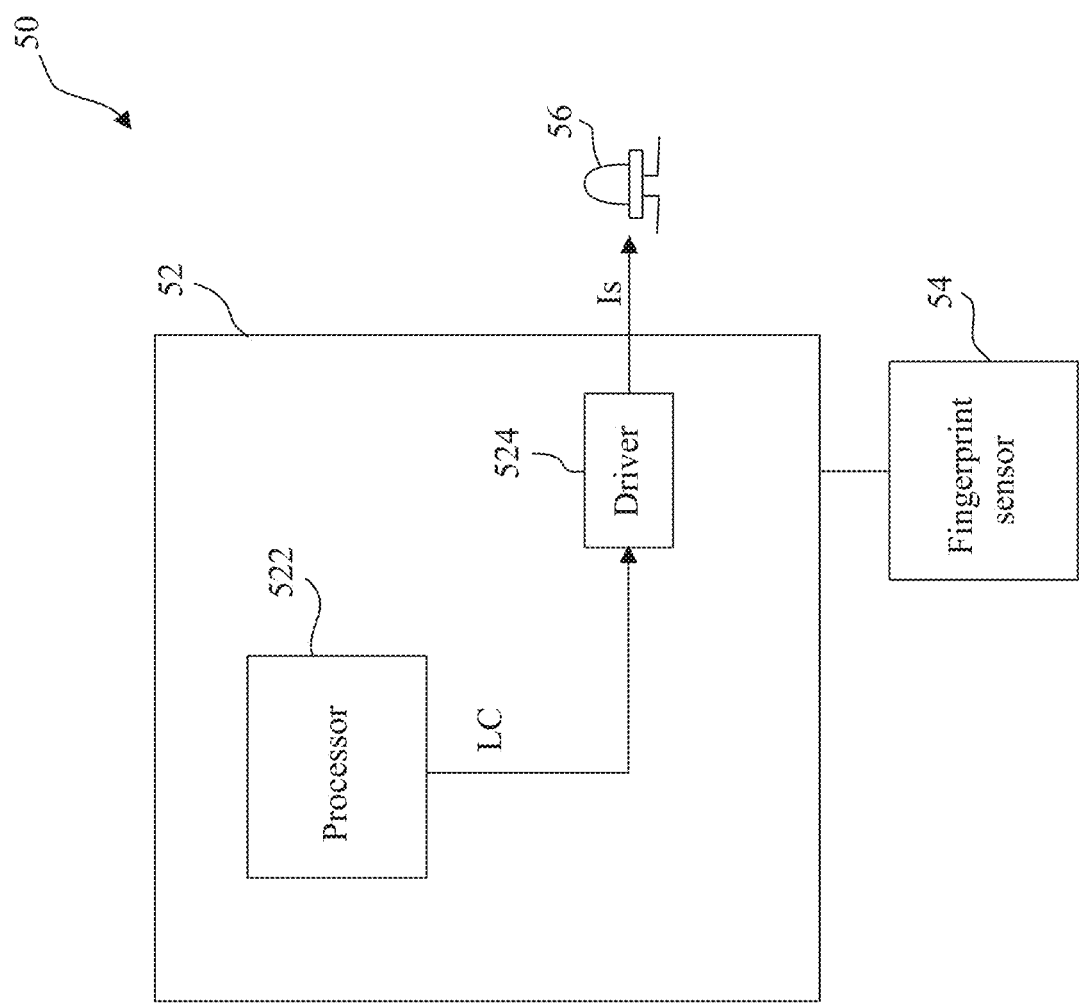
FIG. 15 schematically shows a smart card according to a fifth embodiment of the present invention.
Figure 16:
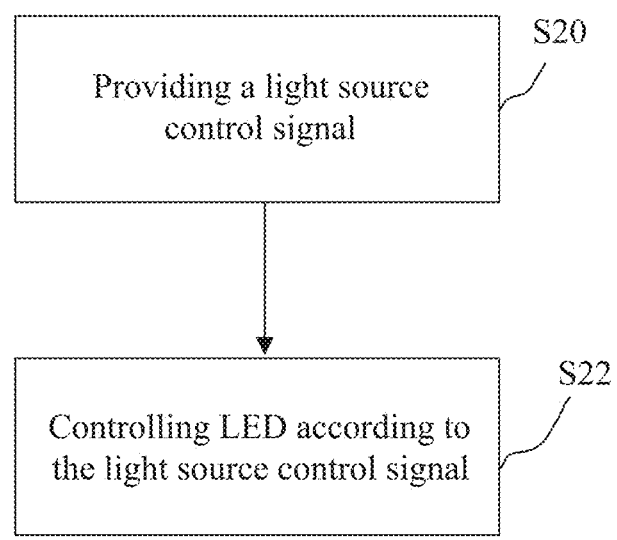
FIG. 16 shows a flowchart of a control method of the smart card in FIG. 15.

FIG. 15 schematically shows a smart card according to a fifth embodiment of the present invention. In FIG. 15, the smart card 50 comprises a microcontroller 52, a fingerprint sensor 54 and the LED 56. The microcontroller 52 includes a processor 522 and a driver 524. FIG. 16 shows an embodiment of a control method of the smart card 50. Refer to FIG. 15 and FIG. 16. In Step S20, the processor 522 provides a light source control signal LC to the driver 524, wherein the light source control signal LC is related to the operation current of the microcontroller 52, the fingerprint sensor 54 or the smart card 50. In Step S22, according to the light source control signal LC, the driver 524 provides a current Is to drive the LED 56 so as to control the turning on/off of the LED 56.

The designer of the microcontroller 52 can know the timings of the indication periods of the smart card 50 in advance and observe the operation currents of the smart card 10, the microcontroller 26 and the fingerprint sensor 18 in a laboratory beforehand. Therefore, the light source control signal LC generated in the embodiments shown in FIGS. 2-11 can be determined in advance. The designer of the microcontroller 52 can incorporate the program of generating the light source control signal LC into the firmware of the microcontroller 52 according to the light source control signal LC determined beforehand. Thereby, while the smart card 50 is performing various procedures, the microcontroller 52 can output corresponding light source control signals LC to the driver 524.

In one embodiment, the light source control signal LC is determined in advance according to the lightening periods (i.e. the indication periods) of LED 56 and the operation current of the smart card required by the customer. For example, the operation currents Iot in various operation procedures of the smart card 10 can be measured in a laboratory in advance, so as to find out the time points that the operation current Iot is greater than the third preset value Itht. According to the time points and the LED lightening periods required by the customer, the designer of the microcontroller 52 can determine the light source control signals LC and incorporate the program code of generating the light source control signals LC into the firmware of the microcontroller 52. In one embodiment, in the lightening periods of the LED 56 required by the customer, the light source control signal LC changes to be "1" to turn off the LED 56 while the operation current Iot is greater than or equal to the third preset value Itht, and the light source control signal LC changes to be "0" to turn on the LED 56 while the operation current Tot is smaller than the third preset value Itht. Thus, the smart card 50 avoids turning on the LED 56 while the operation current Iot exceeds the third preset value Itht, whereby it is guaranteed that the smart card 50 would operate under sufficient power supply.

In conclusion, the smart card according to the present invention comprises a light-emitting element configured to indicate the operation statuses of the smart card in a plurality of indication periods, wherein a first indication period of the plurality of indication periods includes at least one power-saving period; a fingerprint sensor; and a microcontroller connected with the light-emitting element and the fingerprint sensor, wherein the microcontroller decreases the current supplied to the light-emitting element in the power-saving period according to a light source control signal. The control method of a smart card according to the present invention comprises the steps of: providing a light source control signal; and controlling the light-emitting element according to the light source control signal, wherein the operation of the smart card comprises a plurality of indication periods and a first indication period of the plurality of indication periods has at least one power-saving period. The control method includes decreasing the current supplied to the light-emitting element in the power-saving period.

The embodiments have been described above to demonstrate the principles of the present invention and enable the persons skilled in the art to understand, make, and use the present invention. However, these embodiments are only to exemplify the present invention but not to limit the scope of the present invention. The technical thought and scope of the present invention is defined by the claims stated below and the equivalents thereof Any modification or variation according to the principle, spirit or embodiment of the present invention is to be also included by the scope of the present invention.

What is claimed is:

1. A control method of a smart card, said smart card including a microcontroller, a fingerprint sensor and a light-emitting element, an operation of said smart card including a plurality of indication periods, said light-emitting element indicating operation statuses of said smart card in said plurality of indication periods, said control method being performed by the microcontroller and comprising the steps of:

generating a light source control signal by:
providing a first timing signal and a light source control reference signal;
providing a second timing signal; and
generating said light source control signal according to said first timing signal, said second timing signal and said light source control reference signal;
wherein said first timing signal is associated with an operation current of said microcontroller, and said second timing signal is associated with an operation current of said fingerprint sensor; and controlling a current supplied to said light-emitting element by said microcontroller according to said light source control signal;

wherein a first indication period of said plurality of indication periods comprises at least one power-saving period, and said current supplied to said light-emitting element is decreased or zero in said at least one power-saving period;

wherein each of said power-saving period occurs during a high current consumption of said microcontroller, said fingerprint sensor or said smart card, and each of said power-saving period is 30 ms or less.

2. The control method according to claim 1, further comprising a step of providing a selection signal for determining said current supplied to said light-emitting element.

3. A smart card, comprising:
- a light-emitting element, configured to indicate operation statuses of said smart card in a plurality of indication periods, wherein a first indication period of said plurality of indication periods comprises at least one power-saving period;
- a fingerprint sensor; and
- a microcontroller, coupled to said light-emitting element and said fingerprint sensor, configured to decrease a current supplied to said light-emitting element or stop supplying said current to said light-emitting element in said at least one power-saving period according to a light source control signal;
- wherein each of said power-saving period occurs during a high current consumption of said microcontroller, said fingerprint sensor or said smart card;
- wherein said microcontroller includes:
  - a driver, coupled to said light-emitting element, configured to supply said current to drive said light-emitting element;
  - a processor, configured to provide a first timing signal and a light source control reference signal, wherein said first timing signal is associated with an operation current of said microcontroller; and
  - a driving control circuit, coupled to said processor, said fingerprint sensor and said driver, and configured to output said light source control signal to control said current output by said driver;
  - wherein said fingerprint sensor provides a second timing signal to said driving control circuit; said second timing signal is associated with an operation current of said fingerprint sensor; said driving control circuit generates said light source control signal according to said first timing signal, said second timing signal and said light source control reference signal.

4. The smart card according to claim 3, wherein said fingerprint sensor includes a second timing signal generation unit, and said second timing signal generation unit detects said operation current of said fingerprint sensor to generate said second timing signal.

5. The smart card according to claim 3, wherein said microcontroller adjusts said current supplied to said light-emitting element according to a selection signal.

6. The smart card according to claim 3, wherein said at least one power-saving period is shorter than 30 ms.

7. A smart card, comprising:
- a light-emitting element, configured to indicate operation statuses of said smart card in a plurality of indication periods, wherein a first indication period of said plurality of indication periods comprises at least one power-saving period;
- a fingerprint sensor; and
- a microcontroller, coupled to said light-emitting element and said fingerprint sensor, configured to decrease a current supplied to said light-emitting element or stop supplying said current to said light-emitting element in said at least one power-saving period according to a light source control signal;
- wherein each of said power-saving period occurs during a high current consumption of said microcontroller, said fingerprint sensor or said smart card;
- wherein said microcontroller includes:
  - a driver, coupled to said light-emitting element, configured to supply said current to drive said light-emitting element;
  - a processor, configured to provide a first timing signal and a light source control reference signal, wherein said first timing signal is associated with an operation current of said microcontroller; and
  - a driving control circuit, coupled to said processor and said driver, configured to generate said light source control signal according to said first timing signal and said light source control reference signal, wherein said light source control signal is used to control said current output by said driver.

8. The smart card according to claim 7, wherein said at least one power-saving period is shorter than 30 ms.

9. A smart card, comprising:
- a light-emitting element, configured to indicate operation statuses of said smart card in a plurality of indication periods, wherein a first indication period of said plurality of indication periods comprises at least one power-saving period;
- a fingerprint sensor; and
- a microcontroller, coupled to said light-emitting element and said fingerprint sensor, configured to decrease a current supplied to said light-emitting element or stop supplying said current to said light-emitting element in said at least one power-saving period according to a light source control signal;
- wherein each of said power-saving period occurs during a high current consumption of said microcontroller, said fingerprint sensor or said smart card;
- wherein said microcontroller includes:
  - a driver, coupled to said light-emitting element, configured to supply said current to drive said light-emitting element;
  - a processor, configured to provide a light source control reference signal; and
  - a driving control circuit, coupled to said processor, said fingerprint sensor and said driver, configured to output said light source control signal to control said current output by said driver;
  - wherein said fingerprint sensor provides a timing signal to said driving control circuit; said timing signal is associated with an operation current of said fingerprint sensor; said driving control circuit generates said light source control signal according to said timing signal and said light source control reference signal.

10. The smart card according to claim 9, wherein said fingerprint sensor includes a timing signal generation unit, and said timing signal generation unit detects said operation current of said fingerprint sensor to generate said timing signal.

11. The smart card according to claim 9, wherein said at least one power-saving period is shorter than 30 ms.

12. A smart card, comprising:
- a light-emitting element, configured to indicate operation statuses of said smart card in a plurality of indication periods, wherein a first indication period of said plurality of indication periods comprises at least one power-saving period;
- a fingerprint sensor; and
- a microcontroller, coupled to said light-emitting element and said fingerprint sensor, configured to decrease a current supplied to said light-emitting element or stop supplying said current to said light-emitting element in said at least one power-saving period according to a light source control signal;

wherein each of said power-saving period occurs during a high current consumption of said microcontroller, said fingerprint sensor or said smart card;

wherein said microcontroller includes:
- a driver, coupled to said light-emitting element, configured to supply said current to drive said light-emitting element;
- a processor, configured to provide a light source control reference signal;
- a first timing signal generation unit, configured to detect an operation current of said microcontroller to generate a first timing signal; and
- a driving control circuit, coupled to said processor, said first timing signal generation unit, said fingerprint sensor and said driver, configured to output said light source control signal to control said current output by said driver;

wherein said fingerprint sensor provides a second timing signal to said driving control circuit; said second timing signal is associated with an operation current of said fingerprint sensor; said driving control circuit generates said light source control signal according to said first timing signal, said second timing signal and said light source control reference signal.

13. The smart card according to claim 12, wherein said fingerprint sensor includes a second timing signal generation unit, and said second timing signal generation unit detects said operation current of said fingerprint sensor to generate said second timing signal.

14. The smart card according to claim 12, wherein said at least one power-saving period is shorter than 30 ms.

15. A smart card, comprising:
- a light-emitting element, configured to indicate operation statuses of said smart card in a plurality of indication periods, wherein a first indication period of said plurality of indication periods comprises at least one power-saving period;
- a fingerprint sensor; and
- a microcontroller, coupled to said light-emitting element and said fingerprint sensor, configured to decrease a current supplied to said light-emitting element or stop supplying said current to said light-emitting element in said at least one power-saving period according to a light source control signal;

wherein each of said power-saving period occurs during a high current consumption of said microcontroller, said fingerprint sensor or said smart card;

wherein said microcontroller includes:
- a processor, configured to provide said light source control signal; and
- a driver, coupled to said light-emitting element, configured to supply said current to drive said light-emitting element according to said light source control signal;

wherein said light source control signal is associated with an operation current of said smart card.

16. The smart card according to claim 15, wherein said at least one power-saving period is shorter than 30 ms.

* * * * *